(12) United States Patent
Schwartzkopf et al.

(10) Patent No.: US 8,146,755 B2
(45) Date of Patent: Apr. 3, 2012

(54) STORAGE SYSTEMS AND METHODS OF USE OF THE SAME

(75) Inventors: Todd Ed Alan Schwartzkopf, Hudsonville, MI (US); Daniel L. Krueger, Rockford, MI (US); Jonathan T. Moroney, Grand Haven, MI (US); Aaron J. Schradin, Holland, MI (US)

(73) Assignee: Knape & Vogt Manufacturing Company, Grand Rapids, MI (US)

( * ) Notice: Subject to any disclaimer, the term of this patent is extended or adjusted under 35 U.S.C. 154(b) by 0 days.

(21) Appl. No.: 13/118,855

(22) Filed: May 31, 2011

(65) Prior Publication Data

US 2011/0225795 A1 Sep. 22, 2011

Related U.S. Application Data

(62) Division of application No. 12/476,318, filed on Jun. 2, 2009.

(51) Int. Cl.
*A47H 1/00* (2006.01)

(52) U.S. Cl. ..................................... 211/103
(58) Field of Classification Search .............. 211/103, 211/106.01, 207, 87.01, 187, 190, 94.01, 211/90.01–90.04; 248/316.8, 304, 274.1, 248/694, 235, 241–245, 200, 250, 309.1
See application file for complete search history.

(56) References Cited

U.S. PATENT DOCUMENTS

| | | |
|---|---|---|
| 3,765,344 A | 10/1973 | Ferdinand et al. |
| 3,907,113 A | 9/1975 | Kropelnitski |
| 3,993,002 A | 11/1976 | Stroh |
| 4,308,961 A | 1/1982 | Kunce |
| 4,401,222 A | 8/1983 | Kulikowski et al. |
| 4,455,007 A | 6/1984 | Varon et al. |
| 4,684,094 A | 8/1987 | Everett |
| 4,720,016 A | 1/1988 | Kay |
| 5,078,276 A | 1/1992 | Rogge et al. |
| 5,110,080 A | 5/1992 | Rieman |
| 5,332,108 A | 7/1994 | Blass |
| 5,472,103 A | 12/1995 | Merl |
| 5,509,541 A | 4/1996 | Merl |
| 5,526,941 A | 6/1996 | Ford |
| 5,641,081 A | 6/1997 | Merl |
| 5,695,078 A | 12/1997 | Otema |
| 5,715,957 A | 2/1998 | Merl |
| 5,769,247 A | 6/1998 | Merl |
| 5,769,248 A | 6/1998 | Johnson |
| 5,857,577 A | 1/1999 | Thomas et al. |
| 5,921,411 A | 7/1999 | Merl |
| 5,921,412 A | 7/1999 | Merl |
| 6,044,986 A | 4/2000 | Wood |
| 6,129,221 A | 10/2000 | Shaha |
| 6,659,295 B1 | 12/2003 | De Land et al. |
| 6,823,999 B2 | 11/2004 | Heneveld, Sr. |
| 6,932,225 B2 | 8/2005 | Rowe |
| 7,014,052 B2 | 3/2006 | Dettorre et al. |
| 7,086,543 B2 | 8/2006 | Remmers |
| 7,147,114 B2 | 12/2006 | Sarnoff et al. |
| 7,401,705 B2 | 7/2008 | Craft |

(Continued)

*Primary Examiner* — Jennifer E. Novosad
(74) *Attorney, Agent, or Firm* — Cook Alex Ltd.

(57) ABSTRACT

Storage systems and methods of use of the same are disclosed. The storage systems are configured to be connected to wall structures and to be modular in construction, so as to be able to use a plurality of horizontally disposed hang rails and/or a plurality of vertical standards, and/or modular storage components that are received on a hang rail or a vertical standard, or that may be connected directly to a wall structure.

11 Claims, 9 Drawing Sheets

U.S. PATENT DOCUMENTS

| | | |
|---|---|---|
| 7,427,053 B2 | 9/2008 | Nawrocki |
| 7,900,783 B2 | 3/2011 | Fernandez et al. |
| 7,950,536 B2 | 5/2011 | Arradondo et al. |
| 2002/0104938 A1 | 8/2002 | Simard |
| 2003/0193005 A1 | 10/2003 | Hui |
| 2005/0045785 A1 | 3/2005 | Cohen |
| 2005/0109720 A1 | 5/2005 | Marchetta |
| 2005/0145147 A1 | 7/2005 | Costa et al. |
| 2006/0017265 A1 | 1/2006 | Shinn et al. |
| 2006/0231711 A1 | 10/2006 | Shin |
| 2007/0023375 A1 | 2/2007 | Fedewa |
| 2007/0221595 A1 | 9/2007 | Chen |
| 2008/0105636 A1 | 5/2008 | Lawson |
| 2008/0237426 A1 | 10/2008 | Walters |

STORAGE SYSTEMS AND METHODS OF USE OF THE SAME

CROSS-REFERENCE TO RELATED APPLICATION

This application is a divisional application of copending application Ser. No. 12/476,318, which was filed Jun. 2, 2009 and which is incorporated by reference herein in its entirety.

FIELD OF THE DISCLOSURE

This disclosure relates generally to storage systems for conveniently supporting and/or storing objects and, more particularly, to storage systems that are connectable to a wall structure and employ at least one hang rail and/or at least a pair of vertical standards and/or include at least one modular storage component to configure customized storage solutions and methods of use of the same.

BACKGROUND

It is not uncommon to have an abundance of items and yet a shortage of space in which to store such items. This can occur whether in a residential, commercial or public setting.

Prior storage practices commonly relied upon basic shelving or stacking of items. For instance, often storage systems are used within a residential space or retail merchandising environment, and have been made available for support and/or display purposes in various forms. While such shelving methods and structures may be suitable in some instances, they do not tend to accommodate items having multiple shapes and sizes, items that require specially configured holding devices, or permit rapid customization of the storage system to accommodate ever changing needs of the user.

The present disclosure provides a variety of advantageous modular elements that can be configured in many customized storage arrangements to support, store and/or display items in a refined manner and to best utilize available space. The disclosure also illustrates some example storage systems and methods of connecting storage systems to wall structures or connecting various components of a storage system to a wall structure or to each other. The advantageous storage system and components permit rapid and convenient adaptability to changing storage and display needs.

SUMMARY OF THE INVENTION

Although the following discloses example storage systems and methods for their use in supporting, storing and/or displaying items, such as for use in a residential environment, persons of ordinary skill in the art will appreciate that the teachings of this disclosure are in no way limited to such specific embodiments. On the contrary, it is contemplated that the teachings of this disclosure may be implemented in alternative configurations and environments. For instance, although the example storage systems and methods described herein are described in conjunction with configurations for supporting or storing items on shelves, by hooks or other modular storage components, for somewhat generalized use, those having ordinary skill in the art will readily recognize that the example storage systems and methods of their use may be employed in supporting, storing and/or displaying many types of items that require specifically configured components.

Similarly, the storage systems and methods illustrated are configured generally for installation against substantially vertical surfaces of wall structures. Also, it will be appreciated that example storage systems and their methods of use may be configured for installation in various locations, such as a garage, basement, laundry room, pantry, mud room, storage room, closet, work shop, retail store, or other facility which has available one or more wall structures that have substantially vertical surfaces. For purposes of this disclosure, such wall structures may be in the form of wall studs, plywood, wall board, plaster over lath, concrete, concrete block or alternative wall structures, as well as doors made of any suitable materials.

The example storage systems and methods shown further provide the advantageous feature of being readily reconfigured. Depending on the particular configuration and placement of the hang rails, vertical standards, and/or modular storage components chosen, this allows additional system components and/or items of various sizes to be later introduced, frequently without resulting in damage or alterations to wall structures or surfaces. This may provide for increased utility and more enhanced convenience during use. Thus, the disclosure includes storage systems that may be installed with one use in mind, and thereafter may continue to be used for that purpose or may be reconfigured for an alternative purpose.

Various embodiments are disclosed herein. For instance, the disclosure includes a storage system having a first hang rail adapted to be connected in a horizontally disposed position to a wall structure, a plurality of vertical standards adapted to be connected to the horizontally disposed first hang rail, and a second hang rail adapted to be connected in a horizontally disposed position to and generally forward of at least two of the plurality of vertical standards. The system also includes at least the first or second hang rail or at least two of the plurality of vertical standards further receiving at least one modular storage component.

In a related aspect, a method of connecting a storage system to a wall structure is disclosed where the method includes connecting to a wall structure a first hang rail in a horizontally disposed position, connecting to the first hang rail at least two vertical standards, connecting to each of the at least two vertical standards an adapter, connecting to each of the adapters a second hang rail in a horizontally disposed position, and connecting at least one modular storage component to the first or second hang rail or to at least one vertical standard.

In a further aspect, an apparatus for connecting a horizontally disposed hang rail to a vertically disposed standard having a plurality of slots therein is disclosed. The apparatus includes an adapter having an adapter bracket and a locking element, where the adapter bracket has a forward opening that releasably receives a horizontally disposed hang rail and a rearward extension that is releasably engageable with a vertically disposed standard. The locking element is movably connected to the adapter bracket and is movable between an unlocked position wherein a hang rail is receivable in the forward opening of the adapter bracket and a locked position wherein a hang rail is connected to the adapter.

In still a further aspect, an apparatus for connecting a horizontally disposed hang rail to a vertically disposed standard having a plurality of slots therein is disclosed where the apparatus includes an adapter having an adapter bracket and a locking element. The adapter bracket includes a pair of spaced sidewalls connected to at least one intermediate wall, where the sidewalls include a forward facing opening configured to receive a horizontally disposed hang rail, and at least one rearward facing extension configured to engage a slot in a vertically disposed standard. The locking element further includes a body portion, at least one rearward extending projection configured to engage a slot in a vertically disposed standard and is movably engageable with the adapter bracket.

In yet another aspect, a modular storage component is disclosed and is configured for selectable connection to a face of a wall stud, a horizontally disposed hang rail, or a substantially planar wall surface, where the modular storage component includes a body including a central portion connecting a pair of spaced sidewalls. The central portion is selectably connectable to a wall stud when locating a side of the wall stud between the spaced sidewalls and against the central portion. Further, the spaced sidewalls include openings configured to engage a hang rail and being selectably connectable to a hang rail when engaging a hang rail in the openings of the sidewalls. Also, the modular storage component includes a plurality of foot portions with each foot portion extending at an angle from a spaced sidewall and being selectably engageable with a substantially planar wall surface when the foot portions are positioned against the substantially planar wall surface.

In a related further aspect, a method of connecting a modular storage component to a hang rail is disclosed, wherein the modular storage component includes a body having a pair of spaced sidewalls connected by a central portion, with each sidewall having rearward facing openings to receive portions of a hang rail, and a latch member being movable relative to the body. The method includes positioning a modular storage component forward of a hang rail, advancing the modular storage component rearward and downward until the rearward facing openings in the sidewalls have received portions of the hang rail, and moving the latch member upward relative to the body until it reaches a latched position in which the latch member blocks the movement of the body relative to removal of the modular storage component from the hang rail.

Thus, the present disclosure presents alternatives to prior art storage systems and provides advantageous features in more readily reconfigurable, secure systems. It is to be understood that both the foregoing general description and the following detailed description are exemplary and provided for purposes of explanation only, and are not restrictive with respect to the claimed subject matter. Further features and advantages will become more fully apparent in the following description of the preferred embodiments and from the appended claims.

BRIEF DESCRIPTION OF THE DRAWINGS

In describing the preferred embodiments, reference is made to the accompanying drawing figures wherein like parts have like reference numerals, and wherein.

It should be understood that the drawings are not necessarily to scale and provide various views of systems and components that are within the spirit and scope of the disclosure, and which may be used in various configurations and methods relating to storage systems. It also should be understood that the claims are not limited to the preferred embodiments illustrated.

DETAILED DESCRIPTION

Although the following discloses example storage systems and methods for their use in supporting, storing and/or displaying items, such as for use in a residential environment, persons of ordinary skill in the art will appreciate that the teachings of this disclosure are in no way limited to such specific embodiments. On the contrary, it is contemplated that the teachings of this disclosure may be implemented in alternative configurations and environments. For instance, although the example storage systems and methods described herein are described in conjunction with configurations for supporting or storing items on shelves, by hooks or other modular storage components, for somewhat generalized use, those having ordinary skill in the art will readily recognize that the example storage systems and methods of their use may be employed in supporting, storing and/or displaying many types of items that require specifically configured components.

The disclosed examples may be used in any type of format to support, store and/or display items. Thus, the methods, apparatus, and/or articles of manufacture disclosed herein may be advantageously adapted to enhance or improve the organization, support, storage and/or display of any type of items. Accordingly, while the following describes example storage systems and methods of use thereof, persons of ordinary skill in the art will readily appreciate that the disclosed examples are not the only way to implement such storage systems, modular storage components and/or methods.

Figure 1:
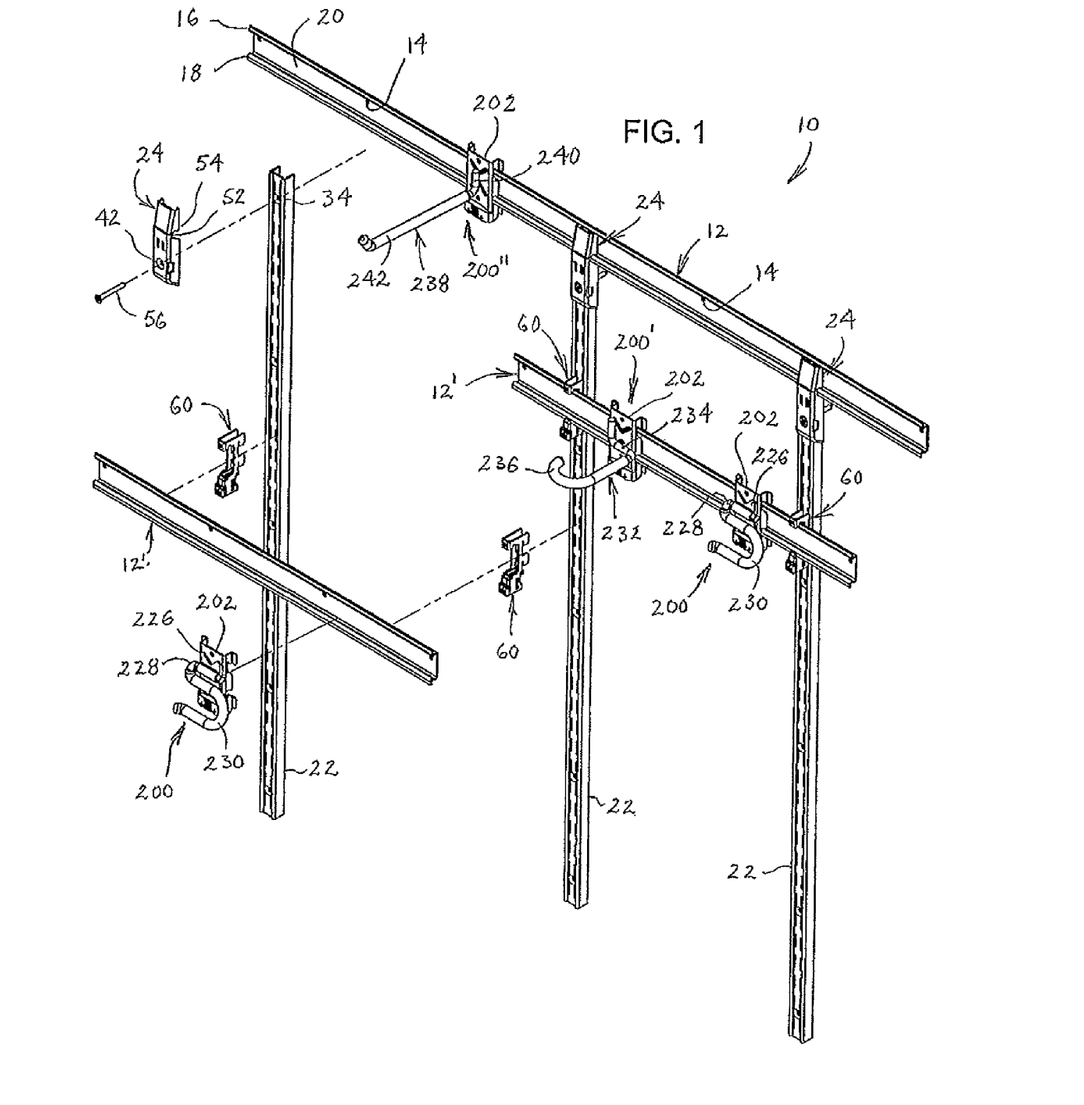
FIG. 1 is a front perspective view of a first example storage system.

A first example storage system 10 is illustrated in FIG. 1. The illustrated example storage system 10 includes a first hang rail 12 that includes apertures 14 to permit connection to wall structures, such as by fasteners (not shown). For purposes of this disclosure, the wall structures may be in the form of wall studs, or substantially vertical and substantially planar wall surfaces such as are presented by wall board, plywood, plaster on lath applications, or the like, and again should be understood herein to include doors. The first hang rail typically is connected to a wall structure in a horizontally disposed position.

Figures 7A, 7B, 7C:
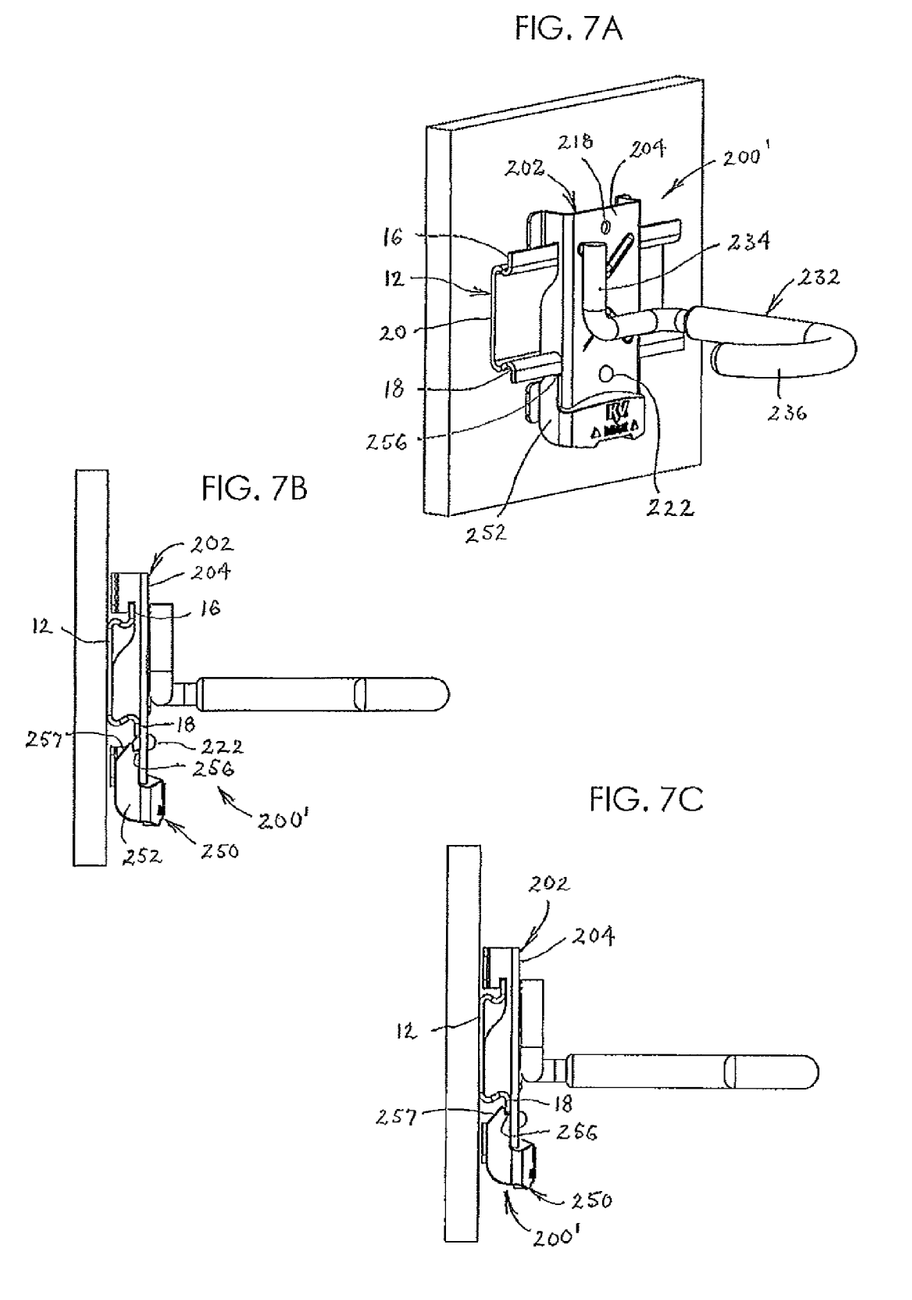
FIG. 7A is a front perspective view of a modular storage component connected to a hang rail that is connected to a wall structure.
FIG. 7B is a side view of the modular storage component engaged with a hang rail as shown in FIG. 7A but with the locking element in an unlocked position.
FIG. 7C is a side view of the modular storage component connected to a hang rail as shown in FIG. 7A, with the locking element in a locked position.

As best seen in FIGS. 1 and 7A, the first hang rail 12 includes an upper portion 16 that extends forward and then upward, and a lower portion 18 that extends forward and then downward. Both the upper portion 16 and the lower portion 18 are connected to a central web portion 20. The first hang rail 12 may be constructed of relatively rigid materials, such as metals, plastics or the like, and generally may be offered in, or cut to, various lengths as would be suitable to a user to extend laterally relative to the wall structure.

Figure 3A:
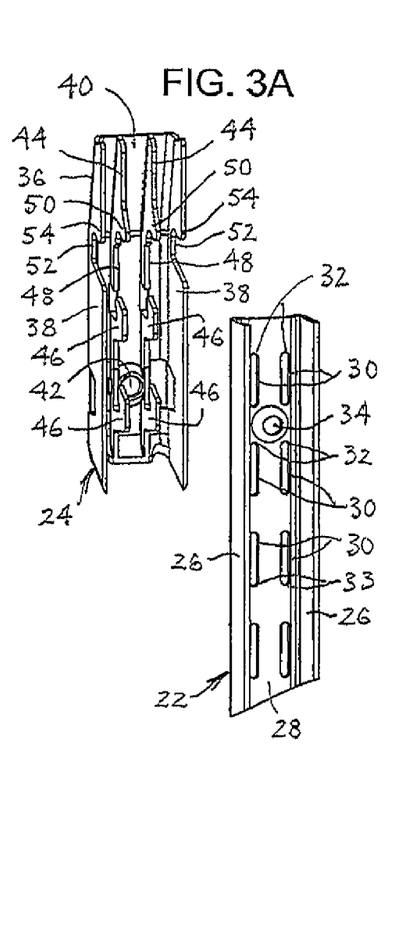
FIG. 3A is a rear perspective view of a hang rail clip spaced from and forward of a vertical standard having two sets of spaced slots.

As shown in FIG. 1, the example storage system 10 also may include vertical standards 22 and hang rail clips 24 that are used to connect the vertical standards 22 to the first hang rail 12. The vertical standards 22 and hang rail clips 24 may be constructed of similar materials to those referred to in respect to the first hang rail 12. The connection between a vertical standard 22 and a hang rail clip 24 is best shown and understood via FIGS. 1, 3A and 3B. The vertical standards 22 include a pair of spaced sidewalls 26 and a face portion 28. The face portion 28 further includes two sets of spaced slots 30 having upper ends 32 and lower ends 33, and may include one or more mounting apertures 34. In turn, the hang rail clips 24 include a body portion 36 having a pair of spaced sidewalls 38, a face portion 40 that may include one or more mounting apertures 42, and a pair of spaced internal walls 44. The spaced internal walls 44 include rearward extensions 46 (in the form of hooks), as well as slots 48 that are defined at their upper end by protrusions 50. The spaced sidewalls 38 include slots 52 that are similarly defined at their upper end by protrusions 54.

Figure 3B:
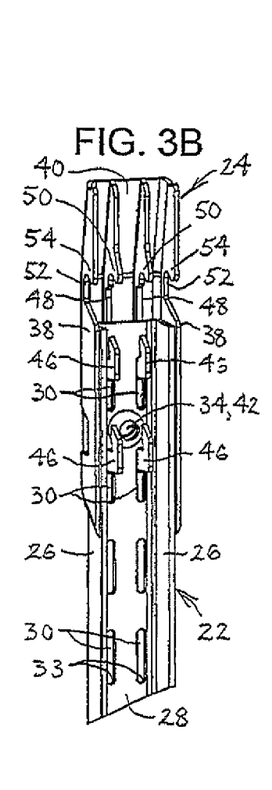
FIG. 3B is a rear perspective view of the hang rail clip and vertical standard that are shown in FIG. 3A, engaged with each other.

To engage a hang rail clip 24 with a vertical standard 22, the rearward extensions 46 of the spaced internal walls 44 should be seated against an upper end 32 of a pair of spaced slots 30 in a vertical standard 22, as seen in FIG. 3B. Thus, a hang rail clip 24 may be advanced toward a vertical standard 22 and positioned so as to have the rearward extensions 46 extend into the slots 30. Then, the hang rail clip 24 may be moved upward relative to the vertical standard 22 until the vertical standard 22 is seated on the rearward extensions 46.

To then engage the combination of the hang rail clip 24 and vertical standard 22 with the first hang rail 12, the hang rail clip 24, to which the vertical standard 22 is engaged, is advanced toward the hang rail 12. The slots 48 in the spaced internal walls 44 and the slots 52 in the spaced sidewalls 38 are moved into a position where they receive the lower portion 18 of the first hang rail 12, and then moved downward until the respective protrusions 50, 54 are seated on the lower portion 18 of the hang rail 12. In this manner, vertical standards 22 may be connected to a first hang rail 12. If it is desired to further stabilize the combination of the hang rail clip 24 and vertical standard 22, a fastener 56 may be installed through the apertures 34, 42 and into the wall structure. Installation of such a fastener 56 may assist in resisting upward or side-to-side movement of the combination, thus preventing inadvertent disengagement, and may provide some additional vertical load capacity.

As shown in FIG. 1, pairs of vertical standards 22 may be used to incorporate into the example storage system 10 connection of a second hang rail 12'. For illustration purposes, FIG. 1 shows a second hang rail 12' in both an exploded view and an assembled, connected view. It will be appreciated that a plurality of second hang rails 12' may be connected to a plurality of vertical standards 22, whether the respective second hang rails 12' share the same pair of vertical standards 22, share one vertical standard and each also depend from a separate vertical standard 22, or simply each depend from its own separate pair of vertical standards 22. Also, the second hang rails 12' are shown having the same configuration as a first hang rail 12, and thus include an upper portion 16', a lower portion 18' and a central web portion 20'. However, it should be understood that a second hang rail 12' need not necessarily have the same configuration as a first hang rail 12. Thus, while it is convenient and somewhat cost effective to utilize common configurations for first and second hang rails 12, 12', the second hang rails 12' may have an alternative configuration relative to a first hang rail 12, as long as the pieces cooperating with any such second hang rails 12' would have their configurations adjusted accordingly.

Figures 5A, 5B:
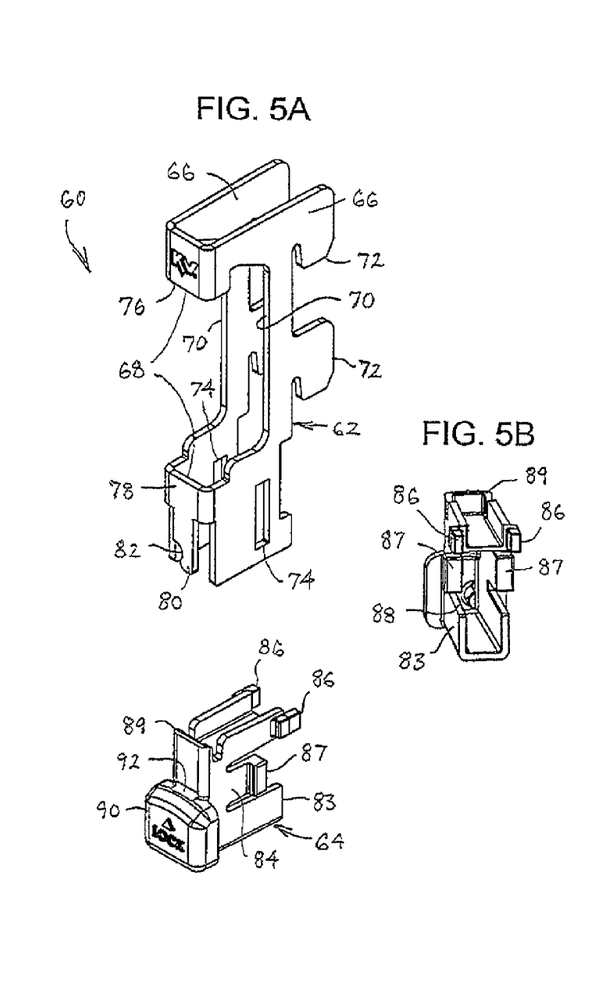
FIG. 5A is a front perspective exploded view of an example adapter having an example adapter bracket and a locking element.
FIG. 5B is a rear perspective view of the locking element shown in FIG. 5A.
Figure 5C:
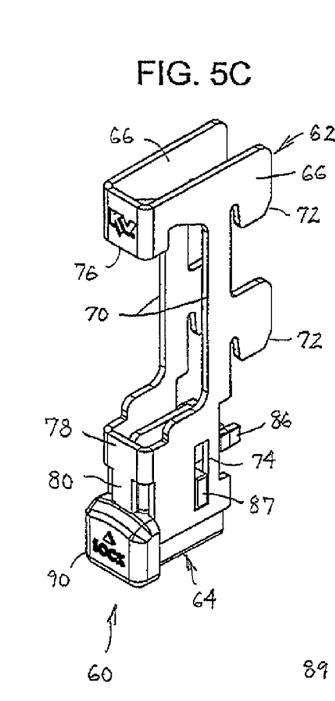
FIG. 5C is a front perspective view of the adapter shown in FIG. 5A, including the locking element engaged with the adapter bracket and being in an unlocked position.
Figure 5D:
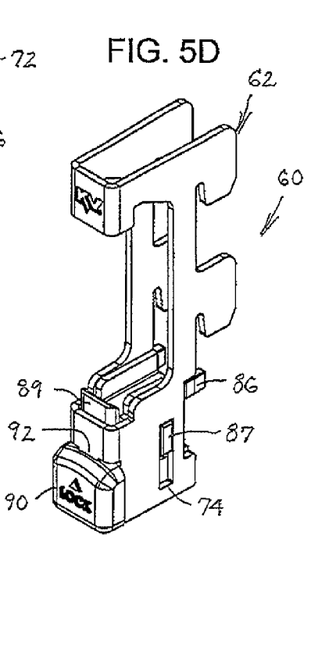
FIG. 5D is a front perspective view of the adapter shown in FIGS. 5A and 5C, including the locking element engaged with the adapter bracket and being in a locked position.

A second hang rail 12' may be connected to a vertical standard 22, for example, such as by use of an adapter 60. The adapter 60 includes an adapter bracket 62 and a locking element 64, with the locking element movable between an unlocked position, as seen in FIGS. 5C and 6B, and a locked position, as shown in FIGS. 5D, 6C and 6D. The example adapter bracket 62 includes a pair of spaced sidewalls 66, connected by at least one intermediate wall 68, with the adapter bracket 62 may be constructed of materials such as those referred to above with respect to the first hang rail 12. In this example, each of the spaced sidewalls 66 includes a forward facing opening 70 that is configured to receive a second hang rail 12', at least one rearward extension 72 that is configured to be insertable into a respective slot 30 of the vertical standard 22, and a slotted aperture 74.

The intermediate wall 68 includes an upper portion 76, and a lower portion 78. The upper portion 76 of the adapter bracket 62 blocks forward displacement of the upper portion 16 of the first hang rail 12 when the hang rail 12 is fully engaged with the adapter 60. The lower portion 78 includes a downward extending first holding portion 80 that includes a groove 82.

The locking element 64 is configured to cooperate with and be movable relative to the adapter bracket 62. As best seen in FIGS. 5A and 5B, the locking element 64 includes a body 83 having sidewalls 84 with at least one rearward extending projection 86 near its upper end, at least one laterally extending projection 87 that extends from a side wall 84, a rearward extending holding portion 88 in the form of a detent, a front upward extending portion 89, a lower front button-shaped portion 90, and an aperture 92 located forward of the upward extending portion 89 and through the button-shaped portion 90. Movement of the locking element 64 is best achieved by a user engaging the button-shaped portion 90. The locking element 64 may be constructed from materials that permit assembly with and movement relative to the adapter bracket 62, such as plastics and the like.

With a slight biasing of the sidewalls 84 that extend from the body 83, the locking element 64 can be moved upward from beneath the adapter bracket 62 to permit the laterally extending projections 87 of the locking element 64 to slide along the sidewalls 66 until they engage and become slidable within apertures 74 of the adapter bracket 62. In turn, the first holding portion 80 at the front of the adapter bracket 62 is slidably received within the aperture 92 of the locking element 64. If the locking element 64 is moved upward to a locked position, the groove 82 of the first holding portion 80 on the adapter bracket 62 engages the rearward extending detent of the second holding portion 88 of the locking element, to tend to hold the locking element 64 upward, in the locked position. In the present example embodiment, as discussed in more detail below, moving the locking element 64 upward to the locked position will simultaneously lock the adapter 60 to the vertical standard 22 and lock the second hang rail 12' to the adapter 60.

Figure 6A:
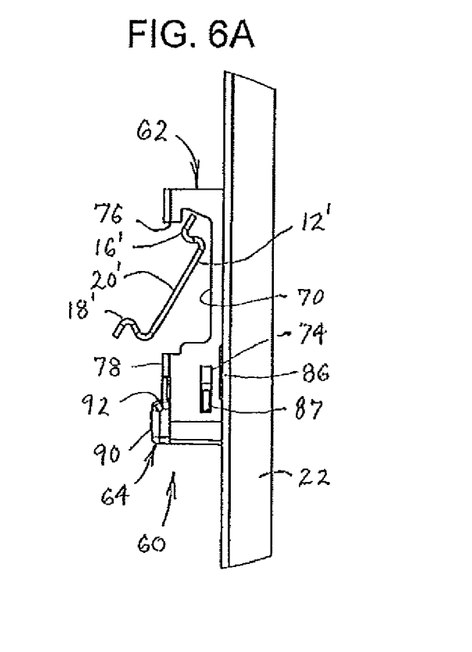
FIG. 6A is a side view of a hang rail initially being engaged with an assembly.
Figure 6B:
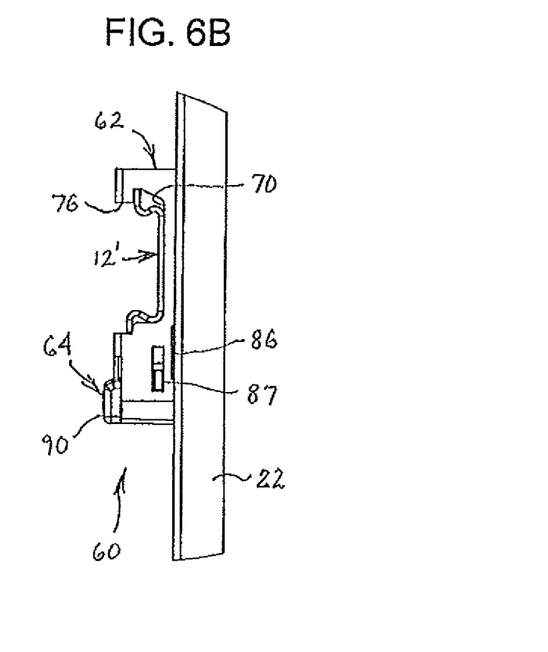
FIG. 6B is a side view of the hang rail shown in FIG. 6A engaged with an adapter having the locking element in an unlocked position.
Figure 6C:
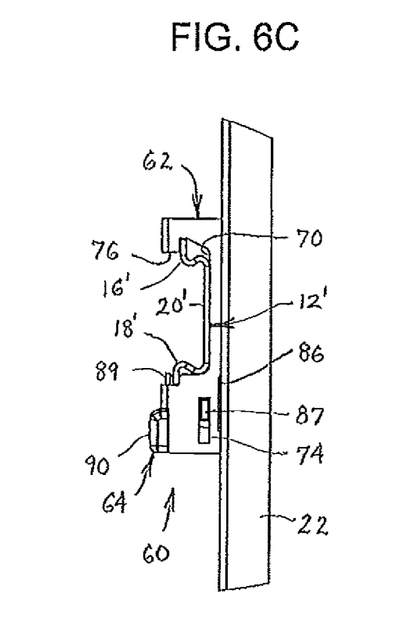
FIG. 6C is a side view of the hang rail shown in FIG. 6A engaged with an adapter having the locking element in a locked position.
Figure 6D:
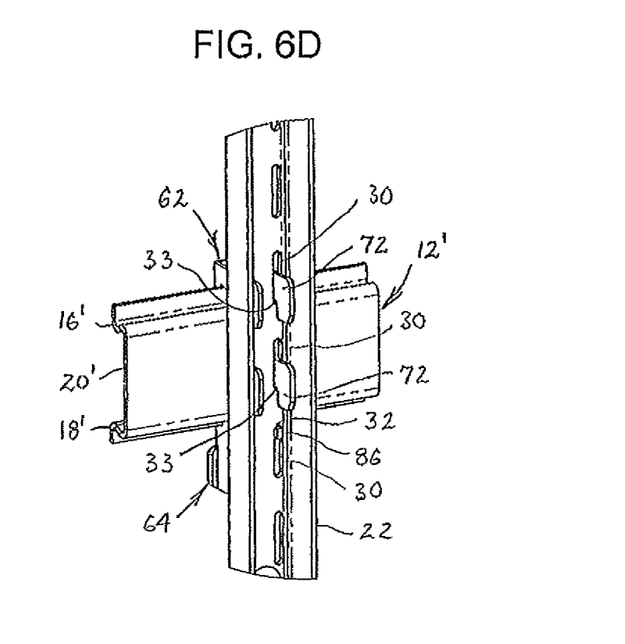
FIG. 6D is a rear perspective view of an adapter and hang rail connected to a vertical standard and shown with the locking element in the locked position.

The engagement and connection of a second hang rail 12', in a horizontally disposed position, to a pair of vertical standards 22, via adapters 60 is illustrated in FIGS. 1 and 6A-6D. As seen in FIG. 6A, a second hang rail 12' may be connected to a vertical standard 22 by advancing an adapter 60 toward a vertical standard 22, inserting the rearward extension 72 into a slot 30 in a vertical standard 22, and moving the adapter 60 downward until at least one rearward extension 72 engages a bottom 33 of the slot 30.

While the adapter 60 is in place and the locking element 64 is in a lower, unlocked position, the upward extending portion 89 at the front of the locking element 64 is retracted or withdrawn from blocking entry or exit of a second hang rail 12', as best seen in FIGS. 5C and 6B. A second hang rail 12' then may be advanced toward the adapter 60, with the second hang rail 12' oriented at an angle to vertical, e.g. inclined. The upper portion 16 of the second hang rail 12' then is inserted into the upper portion of the front opening 70 of the sidewalls 66 of the adapter 60, as shown in FIG. 6A. The second hang rail 12' is then tilted to a substantially vertical position, where the second hang rail 12' is engaged with the front opening 70 of the adapter 60, as shown in FIG. 6B.

To complete the connection, the second hang rail 12' must be blocked from removal. This is achieved by moving the locking element 64 upward to the locked position shown in FIGS. 5D, 6C and 6D. In this example, the button-shaped portion 90 may be engaged and pushed upward to cause the locking element 64 to slide upward via the laterally extending projections 87 sliding in the apertures 74 of the adapter bracket 62. In the upper or locked position of the locking element 64, the second hang rail 12' is blocked from being displaced from the adapter 60 by the upward extending portion 89. The groove 82 of the first holding portion 80 of the adapter bracket 62 also is engaged by the detent of the second holding portion 88 on the locking element 64, thereby holding the locking element 64 in the locked position.

The upward movement of the locking element 64 also simultaneously serves to complete and secure the connection of the adapter 60 to the vertical standard 22. This is accomplished because each rearward extending projection 86 is located in a slot 30 of the vertical standard 22 and is moved upward until it reaches the upper end 32 of the slot 30, as shown in FIGS. 6C-6D. In this locked position, the rearward extending projection 86 blocks inadvertent upward movement of the adapter 60 relative to the vertical standard 22, as best seen in FIG. 6D. Thus, the single movement of the locking element 64 to the locked position completes and secures the connection of the second hang rail 12' to a vertical standard 22 by blocking the inadvertent upward movement of the adapter 60 by a rearward extending projection 86 and by blocking the forward displacement of the second hang rail 12' by an upward extending portion 89.

It will be appreciated that a plurality of first hang rails 12 may be connected directly to a wall structure within a storage system. Also, a plurality of second hang rails 12' may be used and, with vertical standards 22, a storage system may include multiple second hang rails 12' staged at different heights and distances from the surface of such wall structures.

Figures 2A, 2B:
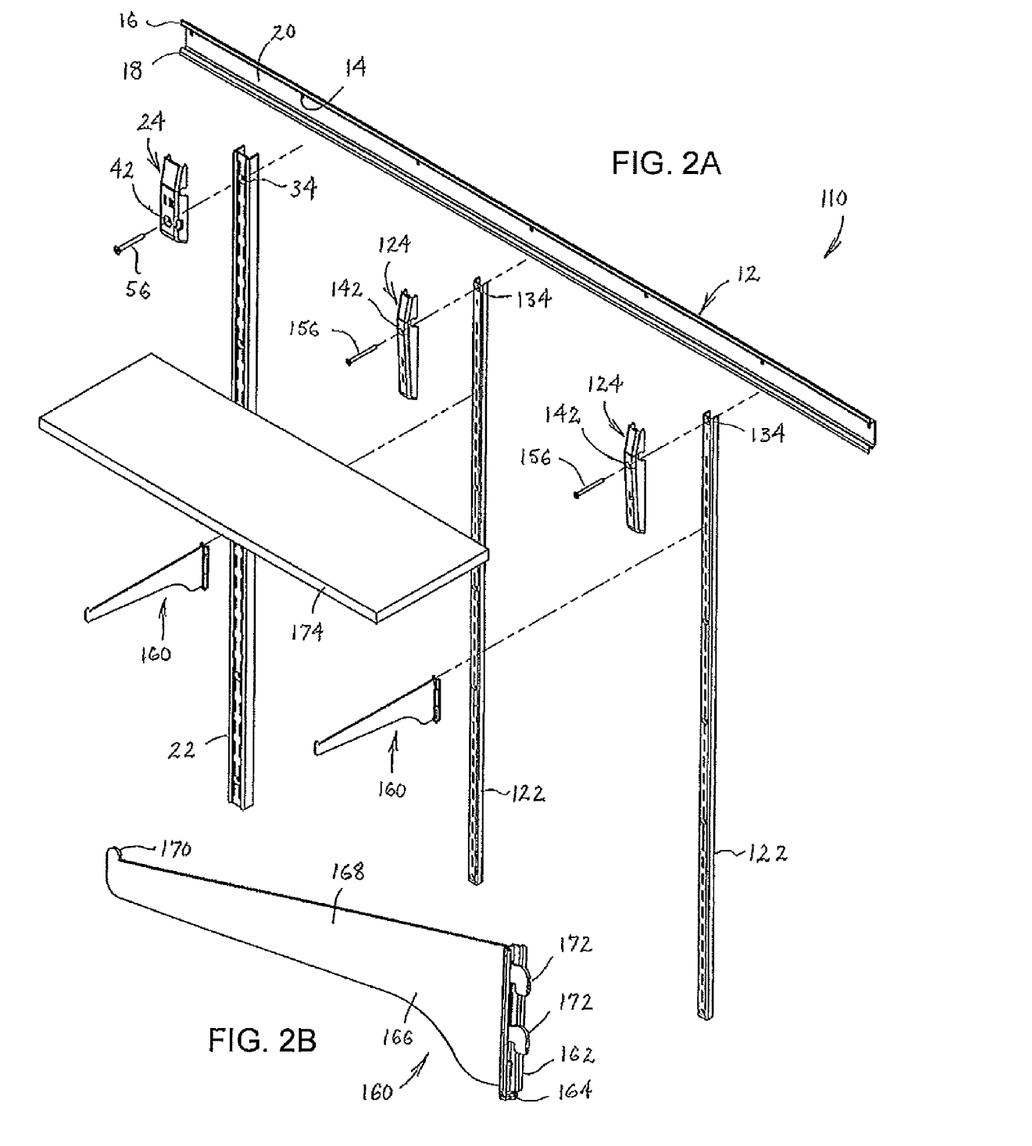
FIG. 2A is a front perspective view of a further example storage system, showing use with a shelf.
FIG. 2B is a rear perspective view of a modular storage component in the form of a shelf bracket for connection to a vertical standard, as shown in FIG. 2A.
Figure 4A:
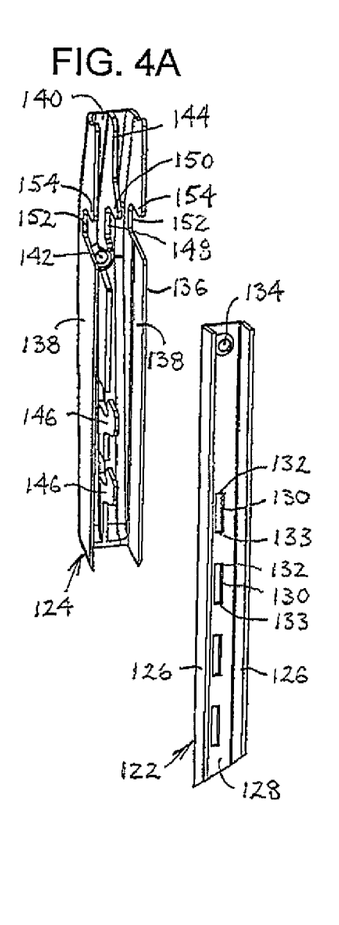
FIG. 4A is a rear perspective view of a hang rail clip spaced from and forward of a vertical standard having one set of spaced slots.

Another example storage system 110 is illustrated in FIG. 2A. The illustrated example storage system 110 includes a first hang rail 12 that is the same as that shown and described above with respect to the first example storage system and methods of use. As shown in FIG. 2A, the example storage system 110 may include vertical standards 122 and hang rail clips 124 that are used to connect the vertical standards 122 to the first hang rail 12 or to a second hang rail 12', such as disclosed in FIG. 1. The vertical standards 122 and hang rail clips 124 may be constructed of similar materials to those referred to in respect to the first hang rail 12. The connection between a vertical standard 122 and a hang rail clip 124 is best shown and understood via FIGS. 2A, 4A and 4B. The vertical standards 122 include a pair of spaced sidewalls 126 and a face portion 128. The face portion 128 further includes one set of spaced slots 130 having an upper end 132 and lower end 133, and may include one or more mounting apertures 134.

In turn, the hang rail clips 124 include a body portion 136 having a pair of spaced sidewalls 138, a face portion 140 that may include a mounting aperture 142, and an internal wall 144. The internal wall 144 includes rearward extensions 146 (in the form of hooks), as well as a slot 148 that is defined at its upper end by a protrusion 150. Each spaced sidewall 138 includes a slot 152 that is similarly defined at its upper end by a protrusion 154.

Figure 4B:
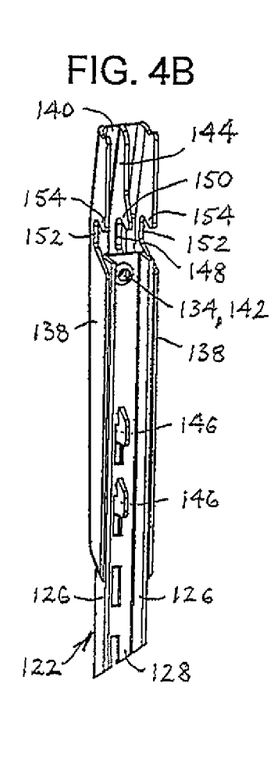
FIG. 4B is a rear perspective view of the hang rail clip and vertical standard that are shown in FIG. 4A, engaged with each other.

To engage a hang rail clip 124 with a vertical standard 122, a rearward extension 146 of the internal wall 144 should be seated against an upper end 132 of a slot 130 in a vertical standard 122, as seen in FIG. 4B. Thus, a hang rail clip 124 may be advanced toward a vertical standard 122 and positioned so as to have a rearward extension 146 extend into a slot 130. Then, the hang rail clip 124 may be moved upward relative to the vertical standard 122 until the vertical standard 122 is seated on a rearward extension 146.

To then engage the combination of the hang rail clip 124 and vertical standard 122 with the first hang rail 12, the hang rail clip 124, to which the vertical standard 122 is engaged, is advanced toward the hang rail 12. The slot 148 in the internal wall 144 and the slots 152 in the spaced sidewalls 138 are moved into a position where they receive the lower portion 18 of the first hang rail 12, and then moved downward until the respective protrusions 150, 154 are seated on the lower portion 18 of the hang rail 12. In this manner, vertical standards 122 may be connected to a first hang rail 12. As with the prior example, if it is desired to further stabilize the combination of the hang rail clip 124 and vertical standard 122, a fastener 156 may be installed through the apertures 134, 142 and into the wall structure. This may assist in resisting upward or side-to-side movement of the combination, thus preventing inadvertent disengagement, and may provide some additional vertical load capacity.

As shown in FIG. 2A, pairs of vertical standards 122 may be used to incorporate into the example storage system 110 connection of a pair of selectively engagable modular storage components 160, shown in this example as shelf brackets. For illustration purposes, FIG. 2A shows an exploded perspective view of a pair of modular storage components 160 in the form of shelf brackets, and FIG. 2B shows an enlarged rear perspective view of one of the shelf brackets 160. It will be appreciated that a plurality of hang rail clips 124 and vertical standards 122, as well as a plurality of hang rail clips 24 and vertical standards 22 may be included in a storage system.

Each modular storage component 160 in the form of a shelf bracket includes a base 162 which is configured to fit adjacent a vertical standard 122 and includes a small rearward projection 164 to help resist inadvertent upward movement and disconnection from a vertical standard 122. Each shelf bracket further includes a body portion 166 having a forwardly extended support portion 168, an upward tab 170 and a pair of rearward extensions 172 (in the form of hooks). The shelf brackets 160 may be constructed of substantially rigid materials, such as metal or the like.

When two or more vertical standards 122 are connected to a hang rail 12, modular storage components 160, such as shelf brackets may be used to support a further modular storage component 174 in the form of a shelf, as shown for example in an exploded view in FIG. 2A. A pair of shelf brackets 160 may be advanced toward a respective pair of vertical standards 122 until the rearward extensions 172 are inserted into slots 130 in the vertical standards 122. The shelf brackets 160 then may be moved downward until the rearward extensions 172 are seated on bottoms 133 of the slots 130. A shelf 174 then may be placed atop the extended support portions 168, with forward movement of the shelf 174 blocked by the tabs 170 on the respective shelf brackets 160. The shelf may be constructed of substantially rigid materials, such as metal, plastic, wood, or the like.

Additional modular storage components may be incorporated into an exemplary storage system or individually connected to wall structures. For instance, beyond the shelf brackets 160 and shelf 174 shown in FIG. 2A, there are three additional examples of modular storage components 200, 200', 200" shown in FIG. 1 as being connectable to the first hang rail 12 or second hang rail 12'. The structure and method of use with respect to the additional example modular storage components is best explained in reference to the examples illustrated in FIGS. 7A-10D. For instance, in FIGS. 10A-10D, a modular storage component 200 is shown having a body 202 including a central portion 204 connecting a pair of spaced sidewalls 206, and a plurality of foot portions 208 with each extending at an angle from a spaced sidewall 206.

The example modular storage component 200 is uniquely suited for connection to a hang rail 12, 12', to a wall stud, or to a substantially planar wall structure. As seen in FIGS. 10A-10D, the spaced sidewalls 206 include upper and lower rearward facing openings 210, 212. The upper rearward facing opening 210 is defined in part by a notch 214 and is configured to accept the upper portion 16, 16' of a hang rail, while the lower rearward facing opening 212 is defined in part by a protrusion 216 and is configured to accept the lower portion 18, 18' of a hang rail 12, 12'.

The central portion 204 may include at least one aperture, but is shown in FIGS. 10A-10D with two apertures 218, 220 in the form of holes therethrough, for receipt of fasteners or a bumper element. An upper aperture 218 generally is open and available to receive a fastener, such as a screw or nail (not shown), if the modular storage assembly 200 is to be connected to a wall structure without the use of a hang rail 12, 12'. As shown, a lower aperture 220 may receive a bumper element 222, which is advantageous when connecting to a hang rail 12, 12' to contact the lower portion 18, 18' of the hang rail 12, 12', as seen in FIG. 7B, to reduce any vibration and any tendency to be inadvertently moved laterally along a hang rail. The bumper element 222 preferably is constructed of a material that is not rigid, such as rubber or plastic, and which can be simply forced into or out of engagement with the lower aperture 220, as needed. The bumper element 222 also may have a relief formed around a central portion (not shown) to permit a more positive engagement with the aperture 220.

The body 202 generally also receives a hanger element 224 directly, or by connection via a further structure, such as a flange 226. The hanger element may be in many forms, and may be constructed of a variety of materials. For example, as shown in FIG. 1 and more particularly in FIGS. 10A-10D, the hanger element 224 includes an S-shaped bent wire (or rod) 228, with a proximal portion connected to the central portion 204 in a pivotal manner by the flange 226, and a more distal portion covered by a cushioned coating 230. The flange 226 may be connected to the body 202 in any suitable manner, such as by welding or use of fasteners, or may be integrally formed therein. The hanger element 224 can be constructed of any suitable material, such as a metal or a rigid plastic. The cushioned coating 230 can be constructed of any suitable coating that may provide some protection to items to be connected to the hanger element, and may be applied in any number of conventional ways, such as by spraying or dip coating.

FIG. 1 and more particularly FIGS. 7A-7D provide a second example of a modular storage component 200', which includes a similar body 202, but instead of having a flange 226 pivotally connecting an S-shaped bent wire 228, the second example includes a hanger element 232 in the form of a hook-shaped rigid wire 234 connected to the body 202, such as by welding, and having a cushioned coating 236 on a distal portion of the wire. FIG. 1 similarly shows a third example modular storage component 200" that includes a hanger element 238 in the form of a relatively straight rigid wire 240 with an upturned end and being connected to a body 202, such as by welding, and having a similar cushioned coating 242 on the wire. It will be appreciated that further configurations and materials may be used for hanger elements in modular storage components, including more flexible materials, such as straps or cords, and associated holding devices such as buckles or clips.

The connection of the various example modular storage components depends on the type of wall structure involved. As illustrated, by way of example, the modular storage components 200, 200' 200" all may be configured for connection to multiple wall structures. For example, the rearward facing openings 210, 212 in the spaced sidewalls 206 of the body 202 of a modular storage component may be configured to receive the upper portion 16, 16' and lower portion 18, 18' of a hang rail 12, 12'. However, to provide a more secure connection that is more resistant to inadvertent upward movement and potential disconnection from a hang rail 12, 12', a latch member 250 may be included to interact with the body 202.

Figure 10A:
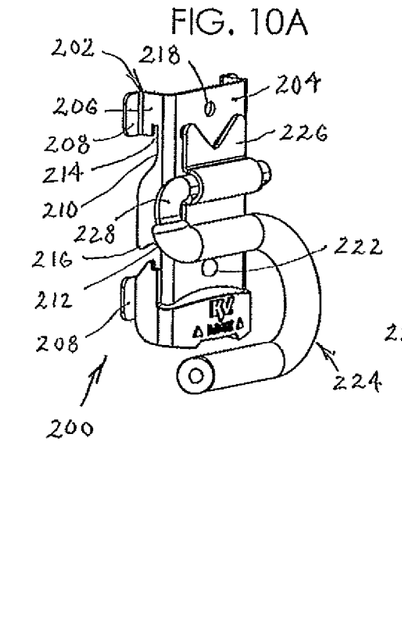
FIG. 10A is a front perspective view of a modular storage component.
Figure 10B:
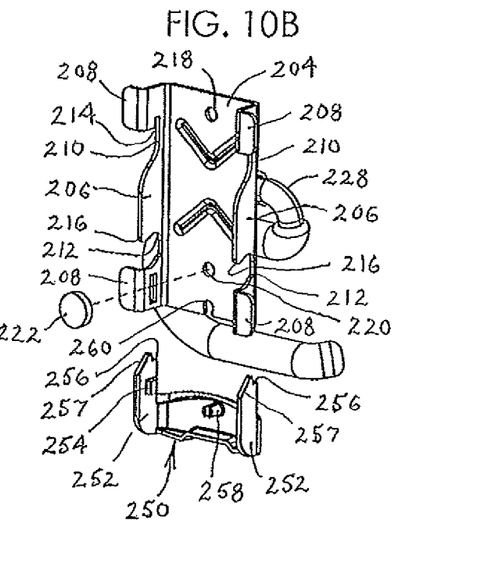
FIG. 10B is a rear perspective partially exploded view of the modular storage component shown in FIG. 10A.
Figure 10C:
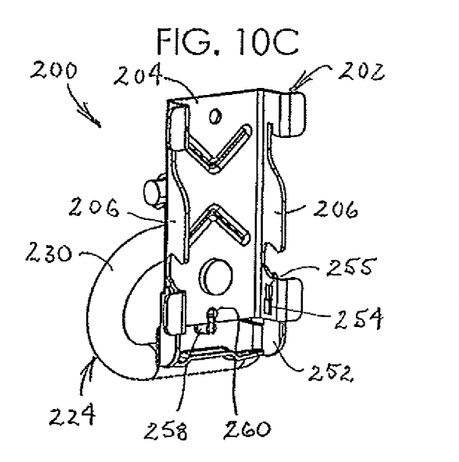
FIG. 10C is a rear perspective view of the modular storage component shown in FIG. 10A with the latch member in an unlatched position.
Figure 10D:
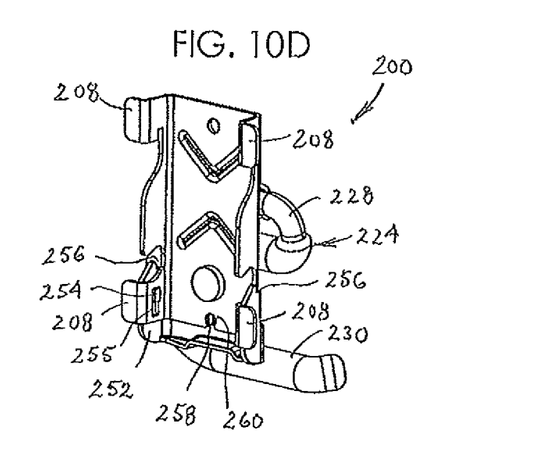
FIG. 10D is a rear perspective view of the modular storage component shown in FIG. 10A with the latch member in a latched position.

As shown in FIGS. 10B-10D, for example, a latch member 250 may include arms 252 having inward facing projections 254, and stops 256 at their upper end, and a holding portion 258 in the form of a detent, to cooperate with corresponding features on the body 202. Thus, the example body 202 may include at least one aperture 255 in each spaced sidewall 206 to receive a projection 254 on an arm 252 of the latch member 250 that is configured to be adjacent a sidewall 206. This provides for sliding engagement between the latch member 250 and the sidewalls 206 of the body 202. The latch member 250 may be constructed of relatively firm material, such as plastic or the like.

The body 202 of a modular storage component 200, 200' 200" also may include a holding portion 260, such as shown in the form of a notch at the lower edge of the central portion 204 in FIGS. 10B-10D. In FIG. 10B, the holding portion 258 of the latch member 250 is seen preferably in the form of a projection having a central slot to permit some deformation while moving into and out of the holding portion 260 which is a notch in the form of an aperture having an open sidewall. The respective holding portion 258 on the latch member 250 and holding portion 260 on the body 202 serve to hold the latch member 250 in an upward, latched position when desired to ensure the modular storage component is not able to be easily inadvertently lifted from or otherwise disengaged from a hang rail 12, 12'.

When connecting a modular storage component 200' to a hang rail 12, 12', such as shown in FIG. 7A, the modular storage component is positioned forward of the hang rail 12, 12' and then advanced rearward and downward until the rearward facing openings 210, 212 in the sidewalls 206 receive the upper portions 16, 16' and lower portions 18, 18' of the hang rail 12, 12' and the modular storage component 200' is seated on the hang rail 12, 12', as shown in FIG. 7B. The stops 256 at the upper end of the arms 252 of the latch member 250 are configured to permit the latch member 250 to be in an upward, latched position prior to connection of the modular storage component 200' to a hang rail 12, 12'. The inclined entry surface 257 on each stop 256 will cause the latch member 250 to automatically be forced downward to an unlatched position as the modular storage component 200' is being moved rearward and downward to an engaged position on a hang rail 12, 12'.

This advantageous feature allows the latch member 250 to be preassembled to the body 202 and set in a consistent upward, latched position. While connecting a modular storage component 200' to a hang rail 12, 12', this feature also causes a visual reminder, when the latch member 250 is forced downward, that the user should complete the connection of the modular storage component to the hang rail by moving the latch member 250 upward to a latched position. When in the latched position, as shown in FIG. 7C, the stops 256 contact the lower edge of the lower portion 18, 18' of the hang rail 12, 12' to block or resist movement of the body 202 relative to removal of the modular storage component from the hang rail 12, 12'. Alternatively, if removal is desired, the latch member 250 may be pushed downward to an unlatched position, and the modular storage component may be lifted upward and away from the hang rail 12, 12'.

Figure 8A:
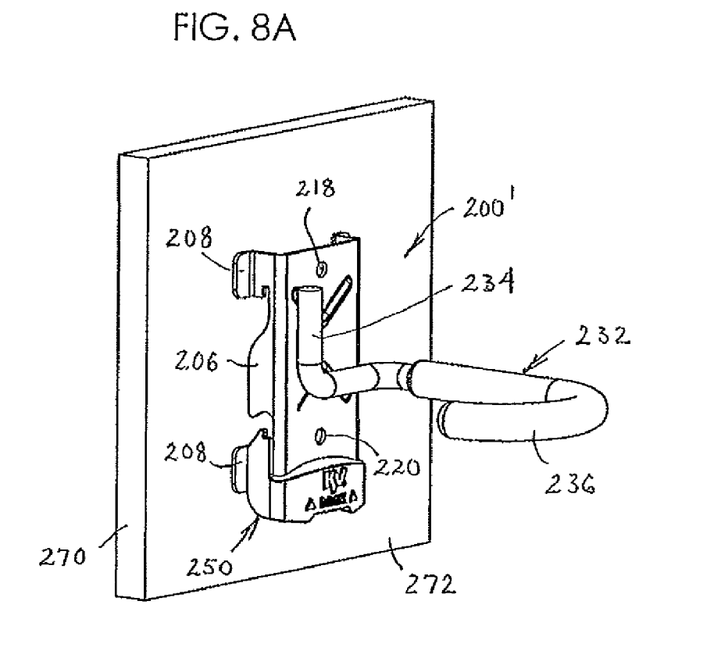
FIG. 8A is a front perspective view of a modular storage component connected to a wall surface, but without the fasteners shown.
Figure 8B:
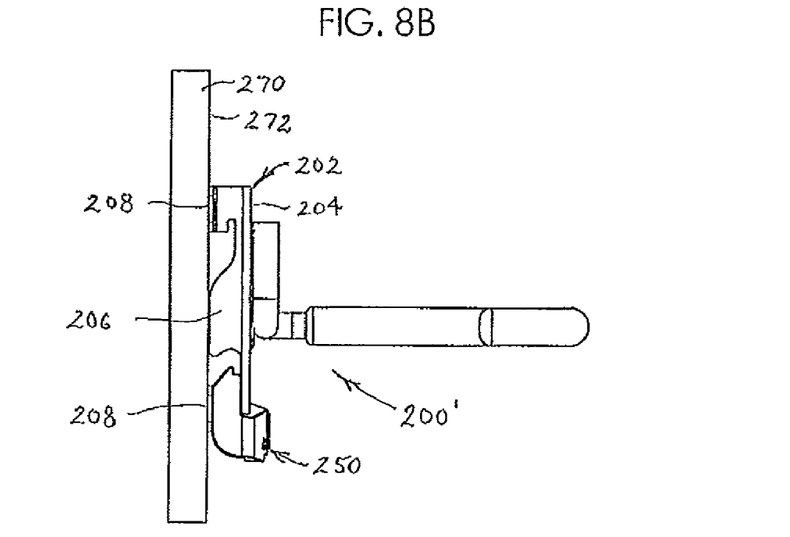
FIG. 8B is a side view of the modular storage component connected to a wall surface, as shown in FIG. 8A without the fasteners.

As previously noted, a modular storage component 200' may be connected directly to a wall structure that presents a substantially planar wall surface, such as shown with wall board section 270 in FIGS. 8A and 8B. In this example, the foot portions 208 are placed against the wall surface 272. The body 202 then may be connected directly to the wall by fasteners (not shown), via an aperture, such as upper aperture 218 and, if the bumper element 222 is removed, also via lower aperture 220. In this method of connection, the latch member 250 is not moved and does not play a functional role because there is no hang rail 12, 12' to be engaged. Instead, depending on the configuration of the wall structure, one or more fasteners may be used, and while they preferably would be screws or nails driven into a support member, such as a wall stud, they alternatively could be anchored by use of wall anchor fasteners or the like. Fasteners having a threaded shaft are preferred, due to their more convenient method of removal.

Figure 9A:
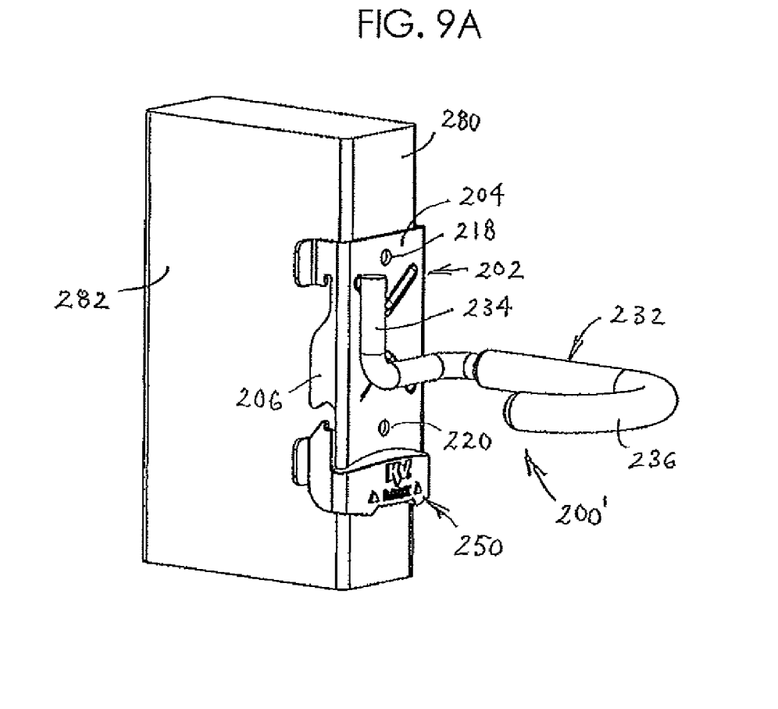
FIG. 9A is a front perspective view of a modular storage component connected to a wall stud, but without the fasteners shown.
Figure 9B:
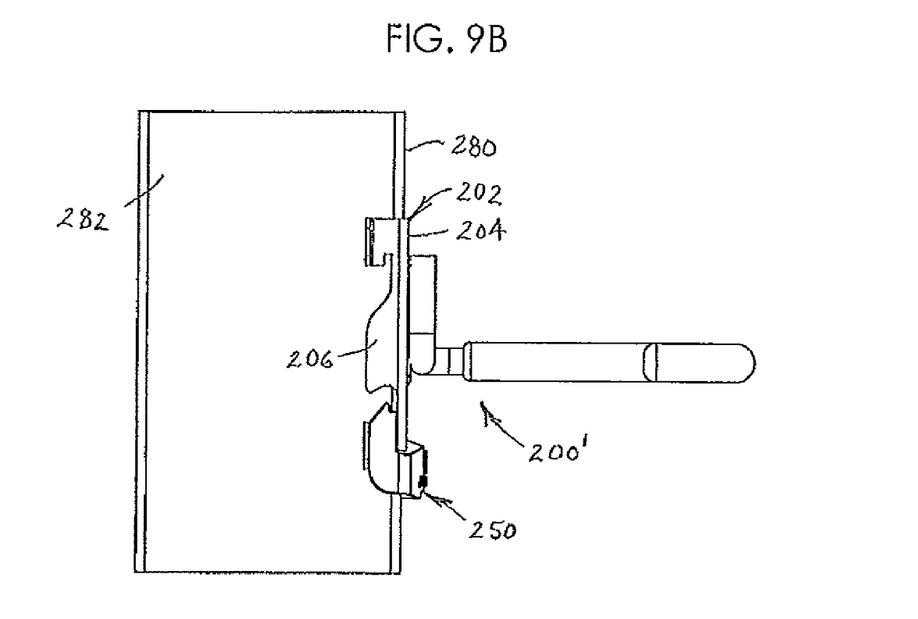
FIG. 9B is a side view of the modular storage component connected to a wall stud, as shown in FIG. 9A without the fasteners.

In another example of direct connection to a wall structure, FIGS. 9A and 9B show a modular storage component 200' in position for direct connection to a wall stud. In this configuration, the bumper element 222 preferably is removed to permit the central portion 204 to be placed against a side 280 of a wall stud 282. Thus, a fastener may be installed through at least one of the apertures 218, 220 and into the wall stud 282 when a side 280 of the wall stud 282 is located between the spaced sidewalls 206 and against the central portion 204 of the body 202. This self-centering configuration of the body 202 provides for very quick and convenient locating of the modular storage component 200' relative to the center of the wall stud 282 for consistent, solid installation of one or more fasteners (not shown), such as screws or nails. As with the example of direct connection of a modular storage component 200' to a wall surface, in this method of direct connection to a wall stud 282, a hang rail 12, 12' is not used, and therefore, the latch member 250 does not play a functional role.

It will be appreciated that the disclosed examples present numerous potential combinations of elements for storage systems and methods of their use. Thus, while the present disclosure shows and demonstrates various example storage systems that may be adapted for use in storing, supporting or displaying items, these examples are merely illustrative and are not to be considered limiting. It will be apparent to those of ordinary skill in the art that various storage systems may be constructed to be connected to a wall structure, without departing from the scope or spirit of the present disclosure. Thus, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of connecting a modular storage component to a horizontal hang rail, wherein the modular storage component includes a body having a pair of spaced sidewalls connected by a central portion, with each sidewall having rearward facing openings to receive portions of a horizontal hang rail, and a latch member being movable relative to the body, the method comprising:

positioning a modular storage component forward of a horizontal hang rail;

advancing the modular storage component rearward and downward until the rearward facing openings in the sidewalls have received portions of the horizontal hang rail; and moving the latch member upward relative to the body until it reaches a latched position in which the latch member blocks the movement of the body relative to removal of the modular storage component from the horizontal hang rail.

2. The method of claim 1, wherein the latch member is configured to resist movement when in the latched position.

3. The method of claim 2, wherein the latch member includes a detent that is in a fixed position on the latch member and engages a notch in the body when the latch is in the latched position.

4. The method of claim 2, wherein the latch member is configured to be resistant to movement when in the latched position and to permit selective movement to an unlatched position.

5. The method of claim 1, wherein the latch member is configured to permit movement downward to an unlatched position.

6. The method of claim 1, wherein the latch member further comprises arms that extend adjacent the sidewalls of the body.

7. The method of claim 6, wherein the arms of the latch member slide relative to the sidewalls of the body when the latch is moved to the latched position.

8. The method of claim 6, wherein each arm of the latch member includes a stop at an upper end of the arm, with the stop configured to permit the latch member to be in an upward latched position prior to connection to a horizontal hang rail and to automatically be forced downward to an unlatched position as the modular storage component is being moved rearward and downward to an engaged position on a horizontal hang rail.

9. The method of claim 8, wherein the stop on each arm of the latch member includes an inclined entry surface that engages and causes the latch member to be automatically moved downward to an unlatched position as the modular storage component is being moved rearward and downward to an engaged position on a horizontal hang rail.

10. The method of claim 1, wherein prior to positioning the modular storage component forward of a horizontal hang rail the latch member is in an upward latched position and is configured to cause the latch member to automatically be moved downward as the modular storage component is moved into engagement with the horizontal hang rail.

11. The method of claim 1, wherein the modular storage component has the latch member in a latched position prior to being moved into engagement with the horizontal hang rail, the latch member is moved to an unlatched position as the rearward facing openings in the sidewalls receive portions of the horizontal hang rail, wherein the movement to the unlatched position provides a visual reminder to return the latch member to the latched position after the rearward facing openings in the sidewalls have received portions of the horizontal hang rail to prevent the modular storage component from being inadvertently removed from the horizontal hang rail.

\* \* \* \* \*